June 11, 1968     B. L. FROST     3,387,501

SHIFT LINKAGE TRANSMISSION

Filed Sept. 10, 1965     2 Sheets-Sheet 1

INVENTOR
BARRY L. FROST
BY
ATTORNEYS

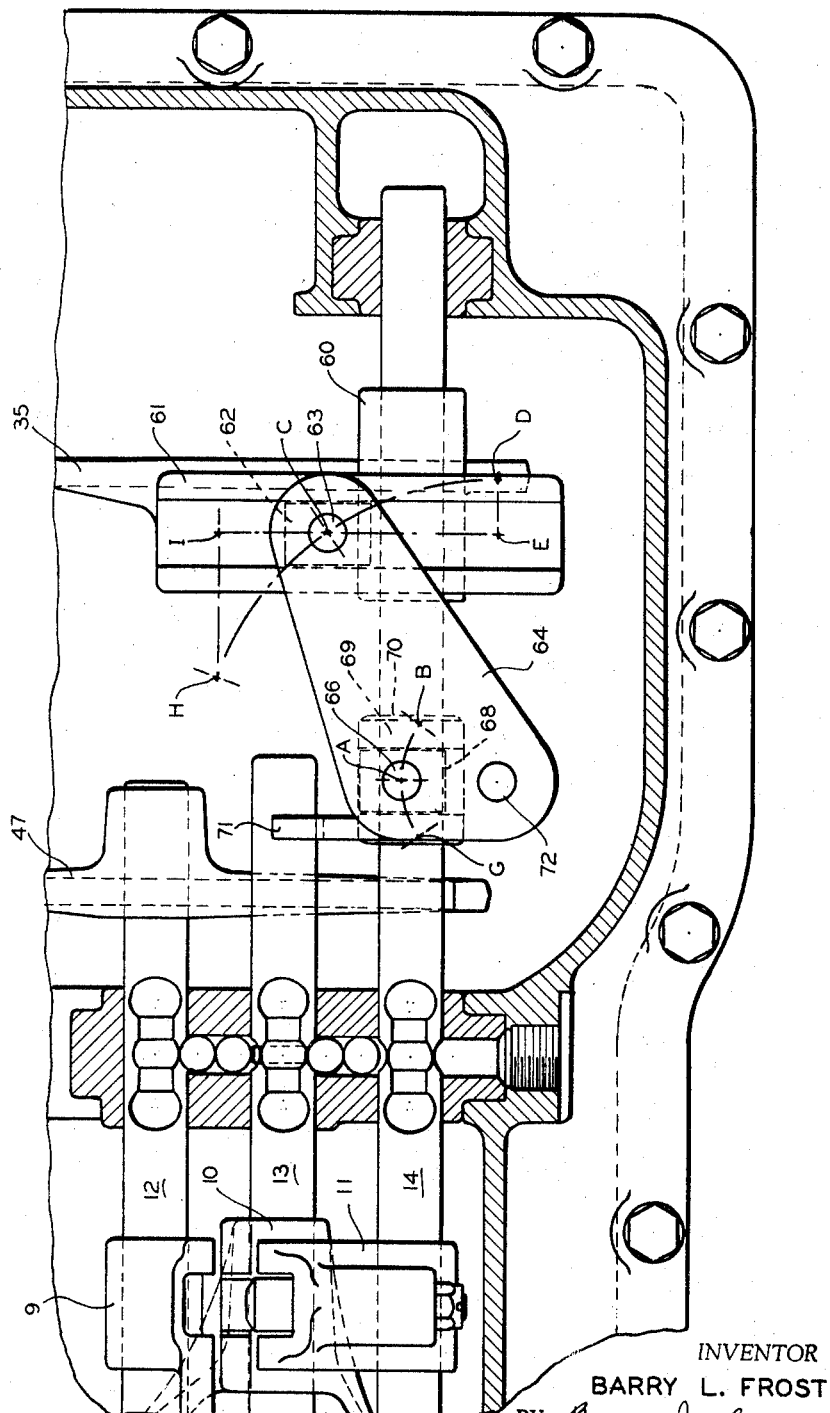

United States Patent Office 3,387,501
Patented June 11, 1968

3,387,501
SHIFT LINKAGE TRANSMISSION
Barry L. Frost, Jackson, Mich., assignor to Clark Equipment Company, a corporation of Michigan
Filed Sept. 10, 1965, Ser. No. 486,403
11 Claims. (Cl. 74—335)

ABSTRACT OF THE DISCLOSURE

Shift linkage means for a transmission which changes equal movement of a shift selector lever in opposite directions from a neutral position to unequal movement of an associated shift fork in opposite directions from a neutral position.

---

Figure 1:
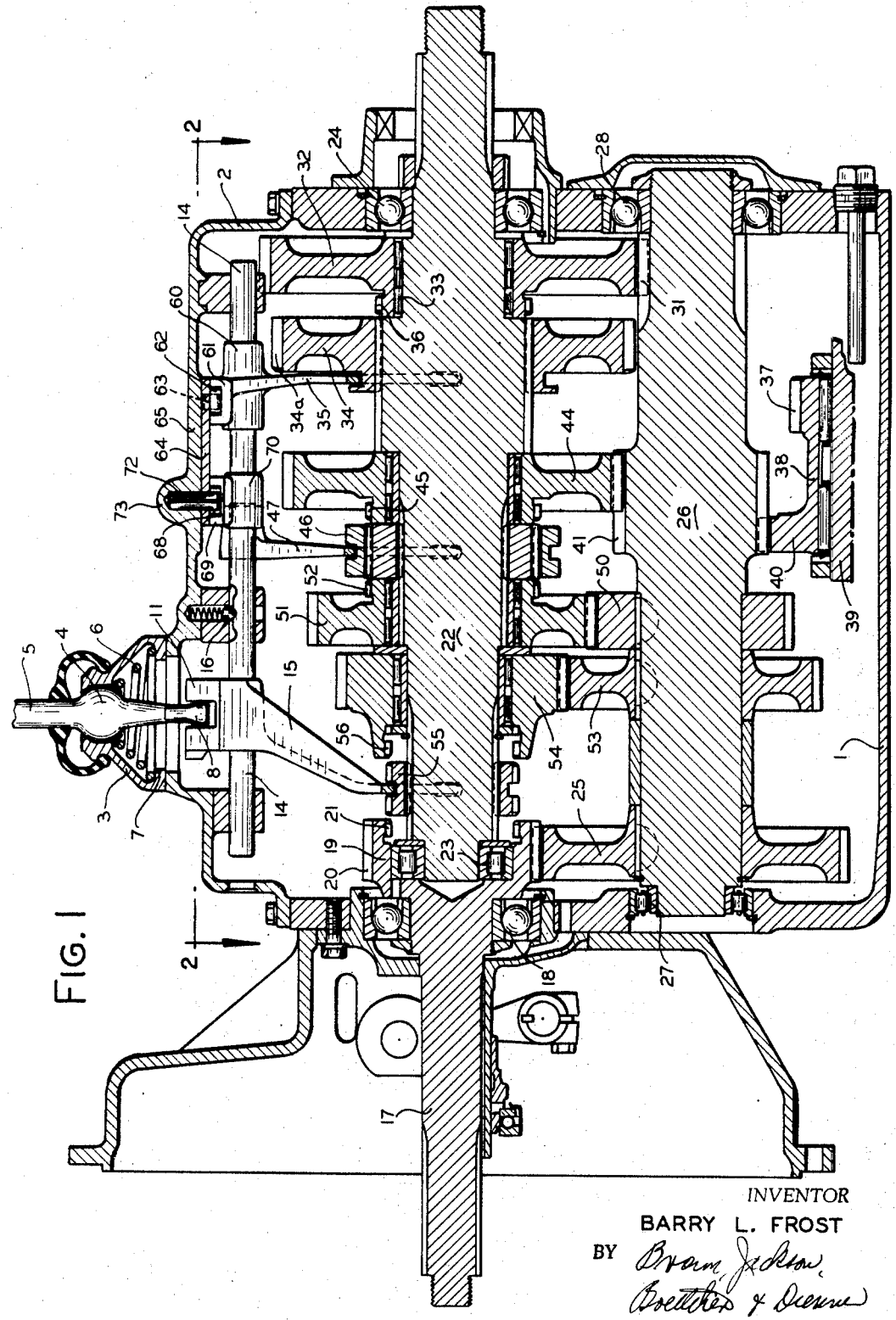

This invention relates to multiple speed transmissions for use in automotive vehicles and analogous purposes, and has to do with linkage means for shifting into low speed forward and into reverse, respectively.

In most manually shifted transmissions the shift fork for engaging reverse or first speed forward must move equal distances in opposite directions from a neutral position to engage reverse drive or first speed forward, as desired. As a result the shift selector lever which is manipulated by the operator is moved the same distance when shifting to reverse drive as when shifting to first speed forward, which is desirable. However, some transmissions are constructed so that the shift fork for engaging reverse drive or first speed forward must move a greater distance from a neutral position to engage reverse drive than is necessary to engage first speed forward. Thus, it may be necessary to move the shift selector lever a greater distance to engage reverse drive than is necessary to engage first speed forward. This difference in distance of movement of the shift selector lever is generally undesirable, and so a principal object of my invention is to provide a shift linkage which changes equal movement of a shift selector lever in opposite directions from a neutral position to unequal movement of the associated shift fork in opposite directions from a neutral position.

A further object of my invention is to provide linkage means which is effective to lock the gear train of a transmission in first forward drive position.

In carrying out my invention in a preferred embodiment thereof, I provide an axially slidable shift rail on which a shift fork is slidably mounted. The shift fork includes a groove in which a slide block is disposed, the slide block being connected to a bell crank which is pivotally connected to a stationary member. Another slide block is connected to the bell crank and is disposed in a groove in a sleeve fixed to the shift rail.

In the drawings:

FIGURE 1 is a vertical lengthwise sectional view of a transmission embodying my invention, certain parts being shown in elevation and certain parts being rotated out of their normal positions for clearness of illustration, as will be explained more fully later; and FIGURE 2 is a sectional view taken substantially on line 2—2 of FIGURE 1, of the housing cover and the parts carried thereby, the cover being partly broken away and the underlying parts being shown in plan with certain thereof partly broken away.

The transmission comprises a suitable housing 1, having a cover 2, provided adjacent its forward end with a dome 3 in which is mounted a ball 4 of a shift lever 5 of conventional type. The ball 4 of lever 5 is held seated at the top of dome 3 by a compression spring 6 seating on an interior flange 7 of dome 3. The shift lever 5 is provided with a downwardly extending tang 8 for selective engagement with lugs 9, 10, and 11 secured on shift rails 12, 13 and 14, respectively, disposed in spaced parallel relation lengthwise of cover 2 and slidably mounted thereon. The lug 10 is formed as part of a shift fork 15, to be referred to more fully later, fixed on the rail 13. Each of the rails is held in endwise adjustment by a spring pressed ball detent 16 engageable in suitably disposed recesses in the top portion of the rail, as is known.

An input shaft 17 is rotatably mounted, adjacent its rearward end, in housing 1 by a ball bearing 18 of known type. Shaft 17 is provided at its rearward end with a hub 19 of increased diameter having formed integral therewith a pinion 20. The pinion 20 is provided with an internal gear 21 for a purpose to be explained more fully hereinafter. The input shaft 17 is coaxial with an output shaft 22 rotatably mounted at its forward end by a roller bearing 23 within hub 19 of input shaft 17, and rotatably mounted at its rearward end in a ball bearing 24 of known type. The pinion 20 meshes with a gear 25 keyed on a counter shaft 26 disposed in spaced parallel relation to the output shaft 22 and rotatably mounted at its ends in bearings 27 and 28. The counter shaft 26 is thus rotated oppositely to the input shaft 17.

The counter shaft 26 is provided adjacent to its rearward end with an integral pinion 31 which meshes with a gear 32 rotatably mounted by bearing 33 of known type on the output shaft 22. For first or low speed forward drive a clutch member 34, splined on the output shaft 22, is shifted, by a shift fork 35 on rail 14, toward the right into engagement with clutch element 36 of gear 32. When reverse drive is desired the clutch member 34, which is a combined clutch and gear member provided with a radially outer gear portion 34a, is shifted by fork 35 toward the left to a position with gear 34a thereof in mesh with a pinion 37 at the rearward end of a sleeve 38 rotatably mounted by suitable bearings on a second counter shaft 39 disposed to one side of the counter shaft 26. The sleeve 38 is provided at its forward end with an integral pinion 40 which meshes with a pinion 41 integral with the counter shaft 26. When gear 34a is meshed with pinion 37 output shaft 22 will then be driven in reverse direction, as will be understood from what has been said. The manner in which the fork 35 is actuated to shift the combined clutch and gear member 34–34a incident to adjustment of the rail 14 will be described in detail hereinafter. Pinion 40 meshes with a pinion 41 integral with counter shaft 26 and pinion 41 meshes with a gear 44 rotatably mounted on output shaft 22. For forward drive at second speed gear 44 is clutched to output shaft 22 by clutch element 45 of gear 44 being engaged by clutch member 46 splined on output shaft 22 and shifted to the right by fork 47 secured on rail 12, incident to shifting of the latter toward the right.

A second gear 50, keyed on counter shaft 26, meshes with a gear 51 rotatably mounted, by appropriate bearings, on the output shaft 22. When third speed forward drive is desired, a clutch member 46, splined on counter shaft 22, is shifted toward the left into engagement with clutch element 52 of gear 51, clutching the latter to output shaft 22 which is then driven at third speed. A third gear 53, keyed on counter shaft 26, meshes with a gear 54 rotatably mounted, by appropriate bearings, on the output shaft 22. When fourth speed drive is desired, a clutch member 55, splined on output shaft 22, is shifted to the right into engagement with clutch element 56 of gear 54, clutching the latter to the output shaft 22 which is then driven at the desired fourth speed. When fifth speed drive is desired, the clutch member 55 is shifted to the left, into engagement with the internal gear or clutch element 21 of pinion 20, effective for establishing a direct drive between the input shaft 17 and the output shaft 22 which is then driven at high or fifth speed.

Referring further to the means for obtaining first speed forward drive and reverse drive, the fork 35 is provided at its upper end with a sleeve 60 slidable on rail 14. Sleeve 60 has a transversely extending and upwardly opening boss 61 of channel cross section. A block 62, slidable in boss 61, receives a pivot pin 63 fixed in the rearward end of a supplementary shift lever 64, in the form of a flat plate, seating against the top wall 65 of cover 2. Lever 64 is pivoted at its forward end on a pivot pin 66 extending into a block 68 slidable in an upwardly opening boss 69 of channel cross section of a lug 70 secured on rail 14. The lug 70 is provided with a slotted tang 71 which straddles the rail 13 and in cooperation therewith restrains lug 70 and rail 14 against turning movement. The lever 64 is also pivoted, adjacent its forward end, on a pivot pin 72 secured in boss 73 of the top wall 65 of cover 2. The lever 64 seats upon bosses 61 and 69 of sleeve 60 and lug 70, respectively, and is effectively restrained thereby against downward movement.

With the shift fork 35 in its neutral position shown the supplemental lever 64 is disposed as shown in FIGURE 2. When forward first speed drive is desired rail 14 is shifted to the right with corresponding movement of lug 70, resulting in movement of pivot pin 66 from its normal position A through a short arc to position B. Such movement of pivot pin 66 swings lever 64 about pivot pin 72 and moves pivot pin 63 through a comparatively long arc from its normal position C to position D. Such movement of pivot pin 66 causes sliding movement of sleeve 60 along rail 14 a distance E-D, with corresponding movement of shift fork 35, thereby shifting clutch member 34 into engagement with clutch element 36 of gear 32 and establishing first speed forward drive. Referring to FIGURE 2, it will be noted that point D and the axis of pivot pin 72 are dipsosed on a line parallel with and spaced from rail 14, in first speed drive. Accordingly, the lever 64 then functions as an over-center toggle effective for locking the transmission in first gear or speed forward drive.

When reverse drive is desired, the rail 14 is shifted to the left thereby moving point A, the axis of pivot pin 66, through a short arc to position G. It will be noted that the arc A-G is equal to the arc A-B. Accordingly, the rail 14 is shifted the same distance for reverse drive as for first speed forward drive, and the shift lever is moved the same distance in each instance. Shifting of rail 14 to the left swings lever 64 about pivot pin 72 effective for moving pivot pin 63 from its normal neutral position through arc C-H, to a position with its axis at point H. In the neutral position of lever 64 pivot pin 63 is disposed to one side of shift rail 14. Accordingly, the distance H-I fork 35 is slid along rail 14 is substantially greater than that through which it is slid along rail 14 for effecting first speed forward drive. The resultant movement of fork 35 through the distance H-I assures full engagement of gear 34a with pinion 37 for reverse drive, thereby avoiding the risk of stripping of the gears due to partial engagement only thereof. As previously noted, in FIGURE 1, the counter shaft 39 is shown as out of its normal position, for clearness of illustration. In its normal position it is disposed to the left of and between the counter shaft 26 and the output shaft 22, as is usual, as viewed from the rearward end of the transmission.

It will be understood that changes in detail may be resorted to without departing from the field and scope of my invention, and I intend to include all such variations, as fall within the scope of the appended claims, in this application in which the preferred form only of my invention is disclosed.

I claim:

1. In a transmission unit of the character described, an input shaft, an output shaft, a shift rail slidable in one direction for forward drive and in the opposite direction for reverse drive, a shift fork slidable on said rail, means for moving said fork along said rail a predetermined distance in one direction responsive to movement of said rail in its said one direction and for moving said fork along said rail a materially greater distance in the opposite direction responsive to movement of said rail in its said opposite direction, means for driving said output shaft from said input shaft responsive to movement of said fork in said one direction, and means for driving said output shaft from said input shaft in a reverse direction responsive to movement of said fork in said opposite direction.

2. In a transmission unit of the character described, an input shaft, an output shaft, a shift rail slidable in one direction for forward drive and in the opposite direction for reverse drive, a shift fork slidable on said rail, linkage means connecting said rail and fork and effective for moving said fork along said rail a predetermined distance in one direction and for moving said fork along said rail a materially greater distance in the opposite direction responsive to movement of said rail in its said opposite direction, means for driving said output shaft from said input shaft responsive to movement of said fork in said one direction, and means for driving said output shaft from said input shaft in a reverse direction responsive to movement of said fork in said opposite direction.

3. In a transmission uint of the character described, an input shaft, an output shaft, a shift rail adjustable in one direction to a predetermined extent for effecting low speed forward drive and adjustable in the opposite direction for effecting reverse drive, the extent of movement of said rail in each direction being the same, means for adjusting said rail, means for driving said output shaft from said input shaft in one direction responsive to movement of said rail to said predetermined extent in said one direction, said adjusting means being effective for locking said rail in its said low speed position, and means for driving said output shaft from said input shaft in a reverse direction responsive to movement of said rail in said opposite direction and to the same extent as its movement in said one direction.

4. In a transmission unit of the character described, an input shaft, an output shaft normally free from said input shaft, a shift rail slidable in one direction to a predetermined extent for effecting low speed forward drive and slidable in the opposite direction for effecting reverse drive, the extent of movement of said rail in each direction being the same, a gear and clutch member splined on said output shaft, a shift fork slidable on said rail and having operating connection to said member, a lever pivotally mounted adjacent one end for movement about a fixed axis, said lever having adjacent said one end a first pivotal connection to said rail restrained against relative movement lengthwise of the latter and movable transversely thereof, said lever having adjacent its other end a second pivotal connection to said fork movable transversely of said rail, said first and second pivotal connections being disposed to one side of said fixed pivot axis and said second pivotal connection being disposed at the opposite side of said rail from said fixed pivot axis, said lever being effective for shifting said gear and clutch member a predetermined distance in one direction to low speed position responsive to movement of said rail to said low speed forward position and a predetermined distance of materially greater extent in the opposite direction to reverse drive position responsive to movement of said rail to reverse drive position, means for driving said output shaft from said input shaft when said clutch and gear member is in its said low speed position, and means for driving said output shaft from said input shaft when said gear and clutch member is in reverse drive position.

5. A transmission unit according to claim 4 in which said fixed axis and pivotal connections are so related that said second pivotal connection and fixed axis are disposed on a line spaced from and substantially parallel with said rail at the same side thereof, when said gear and clutch member is in low speed position, effective for locking said member in its said position.

6. A transmission unit according to claim 4 comprising a housing and a cover therefor and in which the fixed pivot axis of said lever comprises a pivot pin mounted in said cover.

7. A transmission unit according to claim 4 in which said first pivotal connection to said rail comprises a lug fixed on said rail and a block slidable on said lug transversely of said rail and having a pivot pin extending into said lever, and said second pivotal connection to said fork comprises a sleeve on said fork slidable on said rail and a block slidable on said sleeve transversely of said rail and having a pivot pin extending into said lever.

8. A transmission unit according to claim 7 in which said lug and fork are respectively provided with an upwardly opening boss of channel cross section extending transversely of said rail and said blocks are respectively slidably mounted in said bosses.

9. A transmission unit according to claim 8 in which said lever is confined between said cover and said bosses and restrained by the latter against downward movement.

10. For use with a transmission having a casing, shift linkage comprising a shift rail connected to the casing for axially sliding movement, a shift fork mounted on said rail for sliding movement therealong, said fork including a groove therein, a sleeve fixed to said rail and including a groove therein, a plate pivotally connected to the casing and first and second slide blocks connected to said plate in spaced apart relation and slidably disposed in different ones of said grooves.

11. For use with a transmission having a casing, shift linkage comprising a shift rail mounted in the casing for axially sliding movement, a shift fork mounted on said rail for sliding movement therealong, a plate pivotally connected to the casing, a sliding and pivotal connection between said plate and said fork and a sliding and pivotal connection between said plate and said rail, said sliding and pivotal connections being spaced apart from each other and disposed so that equal movement in opposite directions of said shift rail from a given position causes unequal movement in opposite directions of said shift fork from a given position.

References Cited
UNITED STATES PATENTS

| | | | |
|---|---|---|---|
| 2,017,101 | 10/1935 | Lapsley | 74—473 |
| 2,327,550 | 8/1943 | Peterson et al. | 74—473 |

DONLEY J. STOCKING, *Primary Examiner.*

H. S. LAYTON, *Assistant Examiner.*